United States Patent [19]

Hirakawa

[11] Patent Number: 4,635,100
[45] Date of Patent: Jan. 6, 1987

[54] DIGITAL AUTOMATIC VIDEO DELAY SYSTEM

[75] Inventor: Shuji Hirakawa, Yokohama, Japan

[73] Assignee: Kabushiki Kaisha Toshiba, Tokyo, Japan

[21] Appl. No.: 638,572

[22] Filed: Aug. 7, 1984

[30] Foreign Application Priority Data

Sep. 26, 1983 [JP] Japan ............................ 58-148584[U]

[51] Int. Cl.⁴ .......................... H04N 9/44; H04N 9/45
[52] U.S. Cl. ....................................... 358/19; 358/17; 358/22
[58] Field of Search .................. 358/181, 182, 183, 17, 358/19, 22, 140

[56] References Cited

U.S. PATENT DOCUMENTS

| | | | |
|---|---|---|---|
| 4,054,903 | 10/1977 | Ninomiya | 358/19 |
| 4,101,926 | 7/1978 | Dischert | 358/17 |
| 4,109,276 | 8/1978 | Hopkins | 358/19 |
| 4,110,785 | 8/1978 | Dischert | 358/19 |
| 4,214,262 | 7/1980 | Mizukami | 358/19 |
| 4,339,770 | 7/1982 | Dennison | 358/19 |

OTHER PUBLICATIONS

"A Production Technique of a Television Program", pp. 93-94, Section (3), Automatic Color Signal Phase Adjusting Equipment, published by Nippon Hoso Kyokai, 1983.

"Hoso Gijutsu, vol. 25, No. 4, 1972", pp. 103-107.

Primary Examiner—Michael A. Masinick
Attorney, Agent, or Firm—Finnegan, Henderson, Farabow, Garrett & Dunner

[57] ABSTRACT

A digital automatic video delay system includes a device for digitalizing a television signal with sampling clock signals having a frequency of N (an integer) times as high as the frequency of the color subcarrier of the television signal, a device for writing the digitized signal in a memory having a number of addresses equal to or higher than 2N, a device for reading out an address from the memory timed with reference clock signals based on the frequency of the color subcarrier signal, and a device for conducting the write operation and read operation simultaneously but from different halves of the memory.

4 Claims, 9 Drawing Figures

DIGITAL AUTOMATIC VIDEO DELAY SYSTEM

BACKGROUND OF THE INVENTION

The present invention relates to an automatic video delay system for digital processing a television signal.

DESCRIPTION OF THE PRIOR ART

In case two or more video signals are added, or in case one video signal is partially cut to mix another video signal in that cut portion, it is necessary that the plural video signals be in phase. This in-phase state is important especially for a color video signal in which the color signal components are superposed by a subcarrier.

There usually exists a video switcher system for adding two or more video signals or for mixing one video signal with another. All the video signals relating to that system are introduced in phase to the video switcher. Generally speaking, a television camera device, especially for broadcasting use, has a function of adjusting the phases of the output signals therefrom so that the video switcher may be supplied with video signals most nearly in phase. In case, however, one camera output is distributed and supplied to a plurality of video switchers, it is impossible to adjust the phases properly for all the video switchers. In the conventional analog video switcher system, consequently, the phase of the video signals introduced from the outside is adjusted to obtain the most proper phase for the video switcher by equipping the switcher system with an analog automatic video delay circuit (which will be referred to hereafter as "AVDL") at its input side.

This AVDL is a device for comparing the phase of a color burst signal, which is added to a video signal supplied to a video switcher, to the phase of a color burst signal providing the reference phase of that switcher. The phase of an input video signal is automatically adjusted such that the input video signal is brought into phase with the reference phase of the switcher by the adjustment of the transmission line length of the video signal. The AVDL usually has a phase adjusting function up to 360 degrees.

In a digital video switcher system, on the other hand, the video signal to be introduced to a video switcher has to be in phase with the reference phase thereof. In this case, the analog AVDL can be used for the input video signal which has been digitized by an analog/digital (AD) converter. However, the AVDL has a defect in that a waveform distortion is caused deteriorating the characteristics of the waveform, because the AVDL uses a delay element.

In the video switcher system of digital processing, the phase can be adjusted by adjusting the phase which is sampled when the analog signal is subjected to AD conversion. FIG. 1 shows an example of a conventional video delay circuit depending on the adjustment of the phase by sampling. An analog video signal S1 is converted into a digital video signal S2 by the action of an AD converter 10. This AD converter 10 is supplied with clock signals S3 through a variable delay element 11 and an amplifier 12. By adjusting the delay time of this variable delay element 11, the phase of clock signals for the AD conversion can be adjusted so that the digitized video signal can be brought into a desirable phase. Even in the case of the digital video delay system, however, interference noises occur due to the phase relationship of the clock signals for the AD conversion and the clock signals in the later signal-processing step. In order to prevent these noises, a so-called "two step-latch," as known in the art, is used. Specifically, FIG. 2(a) is a diagram showing the circuit construction of the two-step latch; and FIG. 2(b) is a chart showing waveforms for explaining the operations of the two-step latch.

A digital video signal is generally expressed in the waveform indicated at ① in FIG. 2(b). In this Figure, the upper horizontal line indicates the high level (i.e., the "1" level) of the digital video signal, and the lower horizontal line indicates the low level (i.e., the "0" level) of the digital video signal. On the other hand, the oblique lines indicate the transient regions from high to low levels or from low to high levels.

The digital video signal ① is added to a front-step latch circuit 13. If this video signal is latched with the phase of system clock signals ④, as indicated by arrows, an accurate signal cannot be regenerated without making noises, because the digital video signal in that phase is in the transient regions of the signal level. In order to prevent these noises, the system clock signals ④ are delayed by adjusting a delay element 15 to generate adjusted system clock signals 2. These adjusted system clock signals ② are supplied to the latch circuit 13 through an amplifier 16, so that the latch phase is deviated from the transient region of the video signal level. The digital video signal 1 is thus latched with the clock signals 2 at the front-step latch circuit 13.

The output of the latch circuit 13 at this time is shifted to the right in the drawing and is indicated at numeral ③. This digital video signal ③, deviated from the transient region, is latched with the original system clock signals ④, as indicated by arrows, at a rear-step latch circuit 14. As a result, the digital video signal having its phase adjusted with the system clock signals ④ is obtained without making any interferance noise.

The system thus far described is directed to that for phase adjustment of the digital video signal in the case of the digital type. In this construction, however, a new adjustment of the timing of a latch has to be made by manually selecting one of taps of the delay element 15, each corresponding to a predetermined delay time, each time the phase of the input video signal differs, so that the video phase cannot be automatically adjusted.

SUMMARY OF THE INVENTION

An object of this invention is, therefore, to provide a digital automatic video delay system which can automatically adjust the phase of digital video signals.

A further object of this invention is to provide a digital automatic video delay system which will not cause waveform distortions.

Another object of this invention is to provide a digital automatic video delay system which can transfer data through a memory device without ambiguity.

In order to achieve the above objects of the present invention, a digital automatic video delay system is provided comprising: an A/D converter for digitizing the television signal with sampling clock signals having a frequency of an integer N times as high as the frequency of the color subcarrier of the television signal;
   a memory device having a number of addresses equal to or higher than 2N;
   a device for writing the digitized television signal into the memory at an address determined with respect to the phase of the color subcarrier;

a device for reading out the digitized television signal from the memory with clock signals derived from a reference signal determined in coordination with the phase of the color subcarrier; and a device for conducting a write operation and a read operation simultaneously but in different half portions of said memory.

DESCRIPTION OF THE PREFERRED EMBODIMENT

Figure 1:
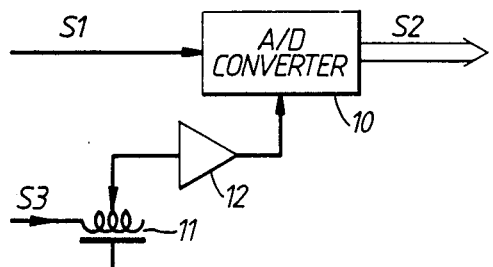
FIGS. 1 and 2(a) are block diagrams showing video delay systems of the prior art.
Figure 2A:
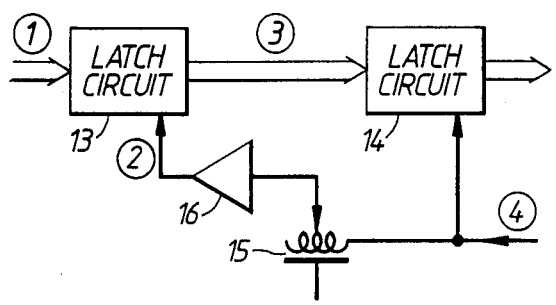
Figure 2B:
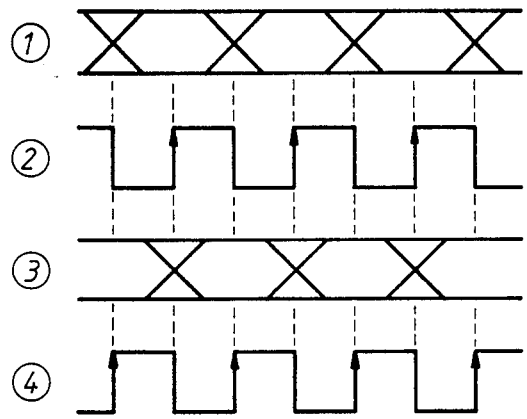
FIG. 2(b) is a timing diagram as to the system of FIG. 2(a)
Figure 3:
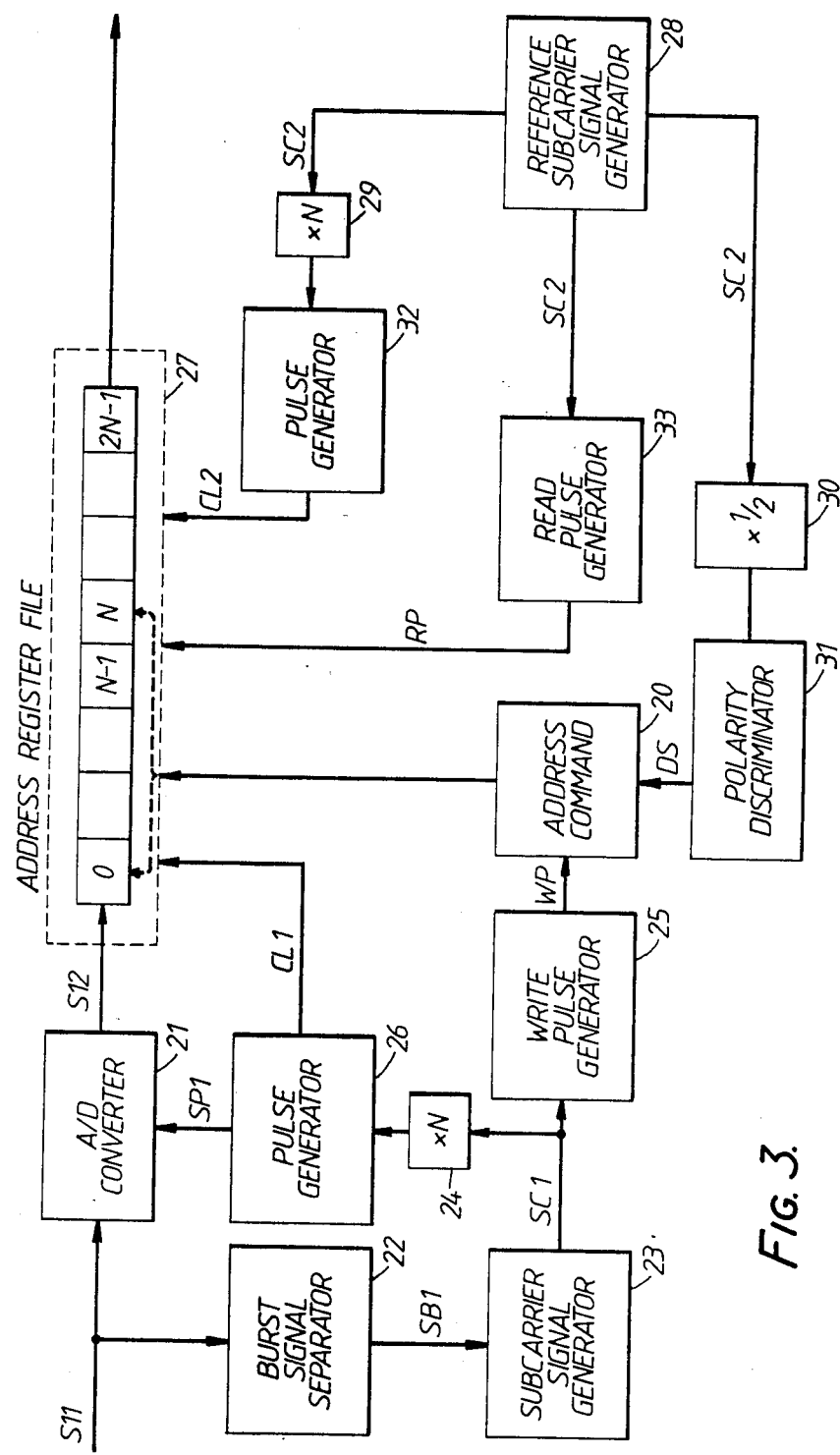
FIG. 3 is a block diagram showing the construction of one embodiment of the present invention.

The present invention will be described in connection with an embodiment thereof with reference to FIGS. 3 and 4.

An analog television signal S11 is introduced to a A/D converter 21 and a color burst signal separator 22. In the color burst signal separator 22, a color burst signal SB1 of a frequency fsc is separated from the television signal S11. This color burst signal SB1 is supplied to a subcarrier signal generator 23 which generates a continuous subcarrier signal SC1 having a frequency of fsc, synchronized with the color burst signal in the television signal S11.

The subcarrier signal SC1 is supplied to a frequency multiplier 24 in which the frequency of the subcarrier signal SC1 is multiplied by N. In the present illustrative embodiment, N=4.

This frequency multiplied signal is supplied to a pulse generator 26 which generates clock signals CL1 and sampling signals SP1. Both signals have a frequency of 4×fsc in the example.

The television signal S11 supplied to the A/D converter 21 is converted into digital signals S12 coordinated with sampling signals SP1. The digitized television signals S12 are written in an address register file 27 of a memory device under control of clock signals CL1 from the pulse generator 26. The address register file 27 has at least 2N addresses, the addresses being divided into two portions of equal size. Where N=4, for example, the register will have addresses 0,1 ... N−1 and N, ... 2N−1.

As a result, four signals in series of digitized television signals may be written in either side of the illustrated address register file 27 in the order of output signals from the A/D converter. The first signal of a series of four signals is written in the address register at 0 or N. Whether the first signal is written at 0 or N of the address register depends on whether a reading operation is being performed. The writing operation will start on the other side from the reading operation, as explained hereinafter.

Figure 4A:
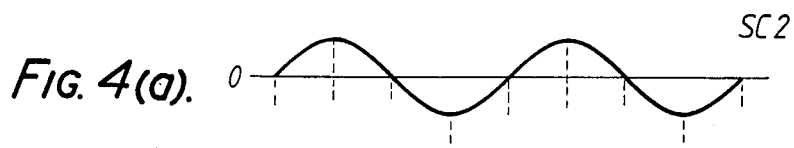
FIGS. 4A-4E are a chart showing waveforms for explaining the operations of the embodiment of FIG. 3.

As to reading, a continuous reference subcarrier signal SC2 having a reference phase in a relevant video switcher system is generated by a reference subcarrier signal generator 28. This reference subcarrier signal SC2, as shown in FIG. 4(a) also has a frequency of fsc. The reference subcarrier signal is supplied to a frequency multiplier 29 which multiplies its frequency by N, here N=4.

Figure 4B:
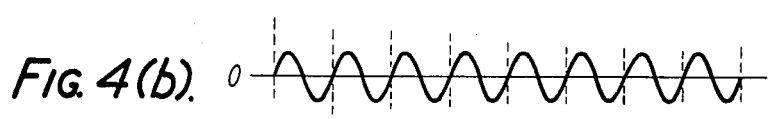
Figure 4C:

The reference subcarrier, having had its frequency multiplied by N, as shown in FIG. 4(b), is supplied to a pulse generator 32 where the pulses are converted to clock signals CL2, as shown in FIG. 4(c). The digitized television signal written in the address register file 27 is read out in coordination with clock signals CL2 from 0 to 2N−1 of the addresses.

Figure 4D:
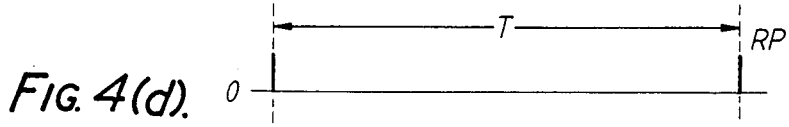

In the read out, an address of the read out is set by 0 by a read pulse, as shown in FIG. 4(d), which is generated at a rate of once to the two rises of the reference signal SC2 (FIG. 4(a)) by a read pulse generator 33.

As a result, the data of addresses 0 to 2N−1 are continuously read out.

The clock signals CL1 and CL2 are independent of each other so that the write data are read out in an unstable state if the write address and the read address are identical or adjacent to each other.

In case the write data are read out in an unstable state, it causes ambiguity.

For preventing any ambiguity, a writing operation may be conducted in the rear half addresses N to 2N−1 in case the front half addresses are being read out and the front half addresses 0 to N−1 in case the rear half addresses are being read out.

The manner of so conducting the writing operation is described below.

The read out begins from address 0 every time the read pulse RP (FIG. 4(d)) is generated so that the front half addresses, for example addresses 0 to N−1, are being read out in the front half of the interval T of the read pulse RP, and the rear half addresses are being read out in the rear half of the interval T of the read pulse RP.

Figure 4E:
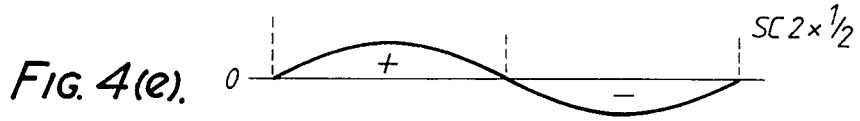

On the other hand, the reference subcarrier signal supplied to a frequency divider 30 has its frequency divided by 2, as shown in FIG. 4(e).

As shown in FIG. 4(e), the positive polarity portion of the frequency divided subcarrier signal corresponds to the front half of the interval T of the read pulse, and the negative polarity portion of the signal corresponds to the rear half of the interval T of the read pulse.

In order to discriminate whether the reading operation is in the front half addresses or in the rear half addresses of the address register file 27, the frequency divided subcarrier signal (FIG. 4(e)) is supplied to a polarity discriminator 31 so that the polarity of the signal is detected.

The polarity detected signal DS has the polarity information of the frequency divided subcarrier signal. This polarity detected signal DS is supplied to a address command 20.

On the other hand, the subcarrier signals SC1 derived from the subcarrier signal generator 23 are supplied to a write pulse generator 25 so that a write pulse WP is generated at a rate of once to each rise of the color subcarrier signal SC1.

The write pulse WP supplied to the address command 20 sets the address of the write at 0 in case the discriminated signal has the negative polarity information or at N in case the discriminated signal has the positive polarity information as shown by the dashed line.

As a result, successive digitized television signals are written in the order of the 0 to 2N−1 or N to 2N−1 and 0 to N−1.

By this manner, the addresses of the write and the addresses of the read out are at opposite sides of the address register file 27 so that the read out of data in an unstable state is prevented.

With this construction, the data in a predetermined phase with respect to the color subcarrier signal SC1 at the write side can be read out in a predetermined phase relationship with the reference color subcarrier signal SC2 at the read side. As a result, a digital video signal in a predetermined phase relationship with the reference color subcarrier signal SC2 can be generated irrespective of the phase of the input signal.

The description thus far made is directed to an example of the construction in which the analog-to-digital conversion is effected by the use of the A/D converter. However, the present invention can be realized by a similar construction in which the digital video signal itself is introduced.

Moreover, the determination of the starting address position uses the regenerated color subcarrier signal SC1 and the reference color subcarrier signal SC2. It is, however, possible to make use of a vertical or horizontal synchronizing signal which has a clear phase relationship with either of the two signals SC1 and SC2.

In the preferred embodiment of the present invention the description has been made in the case of N=4, but an integer other than 4 can also be used.

As is apparent from the foregoing, no delay line, such as a tapped delay element or other structure for adjusting the phase of A/D conversion, is required by the digital automatic video delay system of the invention. Therefore, there is no waveform distortion caused by deterioration of the characteristic of the waveform and no interference noise occurring due to the phase relationship of the sampling clock signals and the clock signals in later steps. According to this invention using a memory, therefore, it is realized to provide a digital automatic video delay system which has no waveform distortion and no interference noise.

What is claimed is:

1. A digital automatic video delay system for a television signal comprising:

means for digitizing the television signal with sampling clock signals having a frequency corresponding to an integer N times the frequency of the color subcarrier of the television signal;

a memory having at least two portions, each portion having a number of addresses corresponding to at least the integer N for storing digitized television signals corresponding to at least 2N of the sampling clock signals;

means for generating a reference signal coordinated in phase relationship with the phase of the color subcarrier signal;

means governed by clock signals derived from said reference signal for reading out from memory digitized television signal resident in one of said at least two portions of said memory; and means for writing said digitized television signal at a write address determined with respect to the phase of the color subcarrier into one portion of said memory at times when said read out means is reading out a digitized television signal from another one of said two portions of said memory.

2. The digital automatic video delay systems as defined in claim 1 wherein the means for writing said digitized signal includes means for decreasing the frequency of the generated signal to one-half the frequency of the subcarrier signal for detecting each half cycle of said reference signal during each cycle of said subcarrier signal, and includes means for selecting said one or another of said memory portions in accordance with the detected half-cycle of the reference signal in which the digitized television signal is being read out.

3. The digital video delay system as defined in claim 2 wherein the selecting means of said writing means includes means for detecting the polarity of each one-half cycle of the reference signal, and includes address command means for selecting one portion of the memory at times when said polarity is positive, and another portion of the memory at times when said polarity is negative.

4. The digital video delay sysem as defined in claim 3 wherein said memory has a front and rear half portion and wherein the address command means includes means for setting addresses of a write-in signal in said rear half portion when polarity is positive and in said front half portion when the polarity is negative.

* * * * *